United States Patent [19]
Imai et al.

[11] 3,918,072
[45] Nov. 4, 1975

[54] SINGLE-LENS REFLEX OPTICAL SYSTEM FOR AN ENDOSCOPE

[75] Inventors: Toshihiro Imai, Fuchu; Takeshi Okada, Hachiouji; Nobuo Yamasita, Iama, all of Japan

[73] Assignee: Olympus Optical Co., Ltd., Tokyo, Japan

[22] Filed: Dec. 11, 1973

[21] Appl. No.: 423,792

[30] Foreign Application Priority Data
Dec. 13, 1972 Japan................................ 47-124979

[52] U.S. Cl. .......................... 354/62; 128/4; 354/79
[51] Int. Cl.² ......................................... G03B 29/00
[58] Field of Search ........... 354/62, 75, 76, 79, 152; 128/4, 6–9

[56] References Cited
UNITED STATES PATENTS

| | | | |
|---|---|---|---|
| 1,573,401 | 2/1926 | Heine | 354/79 |
| 2,699,770 | 1/1955 | Fourestier | 128/6 |
| 3,217,622 | 11/1965 | Kiyono | 128/4 |
| 3,449,036 | 6/1969 | Jacobsen | 240/1 LP |
| 3,638,643 | 2/1972 | Hotchkiss | 354/79 |

FOREIGN PATENTS OR APPLICATIONS
974,675   3/1961   Germany .............................. 354/62

OTHER PUBLICATIONS
"Theoretical first principles of endoscopic photography" The Journal of Photographic Science, Vol. 3, January 1955, by Brian Stanford.

*Primary Examiner*—Richard L. Moses
*Attorney, Agent, or Firm*—Cushman, Darby & Cushman

[57] ABSTRACT

A single-lens reflex optical system for an endoscope having a reflecting mirror with a small hole arranged in the photographing optical system so that said small hole comes to a position substantially at the stop of said photographing optical system. The system is designed for observing the light from the object which is reflected by said mirror through an observing optical system at the same time as photographing by said photographing optical system.

4 Claims, 2 Drawing Figures

SINGLE-LENS REFLEX OPTICAL SYSTEM FOR AN ENDOSCOPE

BACKGROUND OF THE INVENTION

1. Field of the Invention

The present invention relates to an optical system of an endoscope and, more particularly, to single-lens reflex arrangement of a camera at the distal end of an endoscope.

2. Description of the Prior Art

Conventional endoscopes are of the twin-lens reflex camera type. That is, the observing optical system and photographing optical system are assembled in one endoscope. Therefore, the distal end of the endoscope is necessarily long. When such endoscope is used, pain of the patient who undergoes the examination is considerably large when such long distal end is inserted to the body cavity of the patient. Besides, as the observing optical system is positioned on the side of the photographing optical system, it is impossible to find out inconveniences by observing through the observing optical sytem in such cases, for example, when it is impossible to photograph clearly or impossible to photograph at all because gastric juice or the like sticks to the photographing lens when using the endoscope. Furthermore, because of parallax, it is difficult to photograph the desired portion correctly. Thus, conventional endoscopes have various disadvantages.

SUMMARY OF THE INVENTION

It is, therefore, a principal object of the present invention to provide a single-lens reflex optical system for an endoscope which enables both of photogaphing and observing with a bodily eye by the same optical system by arranging a reflecting mirror which has a small hole at the center so that said small hole is positioned near the stop of the photographing optical system.

DETAILED DESCRIPTION OF THE PREFERRED EMBODIMENTS

Figure 1:
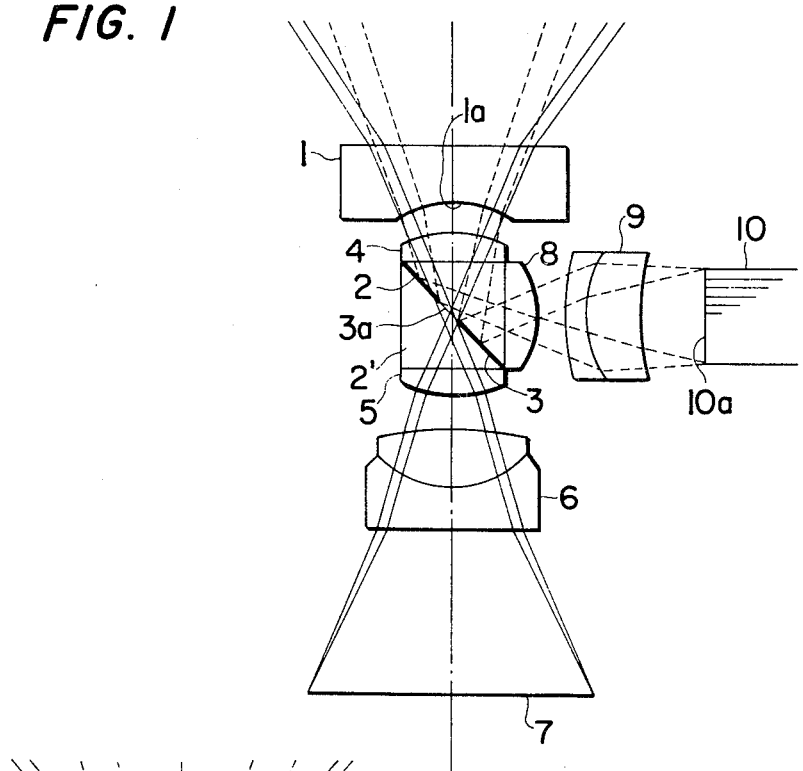
FIG. 1 shows a sectional view illustrating an embodiment of the single-lens reflex optical system for an endoscope according to the present invention.

Referring to embodiments illustrated on drawings, concrete details of the present invention is described below. In FIG. 1, numeral 1 designates a transparent window placed in front of a photographing lens. Though a biplano optical plate is generally used as said window, the window 1 used in the present embodiment has a concave inner surface 1a so that it serves as a concave lens. Consequently, the field angle of the lens system becomes large. Numerals 2 and 2' respectively designate isosceles right triangular prisms. At the cemented surface of said prisms 2 and 2', a reflecting mirror 3 having a small hole 3a at the center is provided. Numerals 4 and 5 respectively designate convex lenses. Numeral 6 designates a photographing lens arranged to focus the image of the object to be observed onto the film surface 7 cooperating with the transparent window 1 (a concave lens as mentioned above) and convex lenses 4 and 5. Besides, it is so arranged that the stop of the photographing optical system, which comprises said transparent window 1, convex lenses 4 and 5 and photographing lens 6, comes to a position near the small hole 3a formed at the center of the reflecting mirror 3. Numeral 8 designates a convex lens and numeral 9 designates an observing lens. The transparent window 1, convex lenses 4 and 8 and observing lens 9 compose an observing optical system so that the light from said object to be observed is imaged on one end face 10a of an image guide 10 comprising optical fiber after said light being reflected by the reflecting mirror 3. The image of the object focused on the end face 10a of the image guide 10 is transmitted by the image guide 10 to its other end face and is observed by an eye, as known widely, by means of an eyepiece which is not illustrated. It is so designed that the stop of this observing optical sytem comes to a position other than the small hole 3a provided at the center of the reflecting mirror 3 (in case of the present embodiment, the stop is positioned near the cemented surface of the prism 2 and convex lens 8). Though the reflecting mirror 3 is provided at the cemented surface of prisms 2 and 2' in case of the present embodiment, it is also possible to provide the reflecting mirror only, without using prisms 2 and 2'.

By the above-mentioned embodiment, it is possible to photograph the object to be observed on the film 7 by means of the photographing optical system, which comprises the transparent window 1, convex lenses 4 and 5 and photographing lens 6 as described already, and at the same time, completely the same portion of the object which is to be photographed as above can be observed by an eye from outside by means of known art because the light from that portion of the object is imaged on the end face 10a of the image guide 10 after passing through the observing optical system which comprises the transparent window 1, convex lens 4, prism 2, convex lens 8 and observing lens 9 and being reflected by the reflecting mirror 3.

Figure 2:
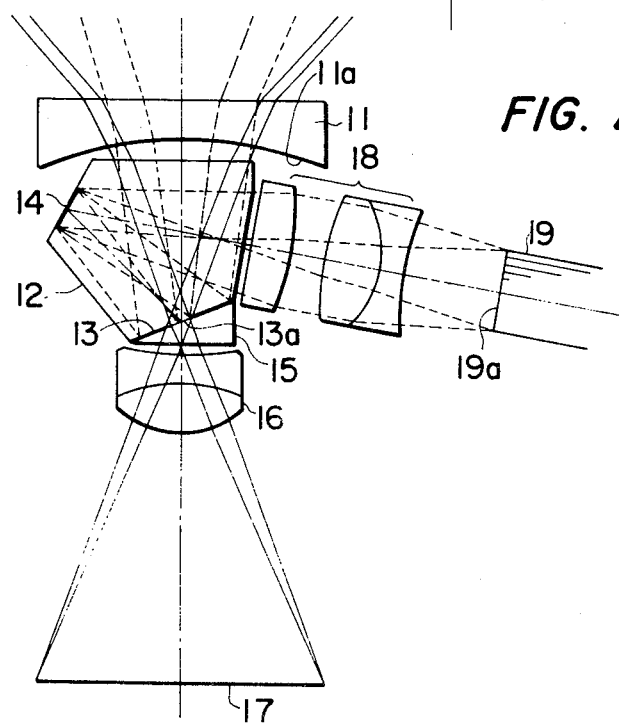
FIG. 2 shows a sectional view illustrating another embodiment of said optical system according to the present invention.

FIG. 2 shows another embodiment of the present invention. In this embodiment, a penta-prism is used instead of isosceles right triangular prisms 2 and 2' employed in the first embodiment shown in FIG. 1. In FIG. 2, numeral 11 designates a window of transparent material, its surface 11a on one side being a concave surface. Numeral 12 designates a penta-prism, numeral 13 designates a reflecting mirror having a small hole 13a at the center, numeral 14 designates a mirror, and numeral 15 designates an auxiliary prism made of material same as the penta-prism 12. Numeral 16 designates a photographing lens which forms a photographing optical system cooperating with the window 11. By this photographing optical system, the image of the object to be observed is focused on the surface of the film 17. It is so designed that the stop of the photographing optical system comes to a position near the small hole 13a at the center of the reflecting mirror 13. Numeral 18 designates an observing lens. Out of the light from the object to be observed, the light reflected by the reflecting mirror 13 is further reflected by the mirror 14 and is focused, by this observing lens 18, on the end face 19a of the image guide 19. In other words, the window 11 and observing lens 18 form an observing optical system. The image of the object, which is focused on the end face 19a of the image guide 19 by means of this observing optical system as described above, is transmitted by the image guide 19 to its other end and is observed by using an eyepiece as known widely. It is so designed that the stop of this observing optical system comes to a position other than the reflecting mirror 13 (for example, to a position on the mirror 14).

Also in the second embodiment described in the above, the portion of the light from the object which passes through the window 11 and small hole 13a of the reflecting mirror 13 is focused on the surface of the film 17 by means of the photographing optical system which comprises the window 11 and photographing lens 16 and is photographed. On the other hand, out of the light from the same portion of the object, the light reflected by the reflecting mirror 13 is reflected again by the mirror 14 and, then, focused by the observing lens 18 on the end face 19a of the image guide 19. This image is transmitted by the image guide 19 and is observed by an eye by the known art. Therefore, it is possible to photograph and observe completely the same portion of the object at the same time.

As illustrated by the above-mentioned embodiments, the single-lens reflex optical system for endoscopes according to the present invention is arranged so that the light from the object which passed through the window can be photographed onto the film by the photographing optical system and, at the same time, the light from the same window can be observed by an eye through the observing optical system. Therefore, it is not necessary to arrange two optical systems for photographing and observing at different positions. Consequently, it is possible to make the distal end of the endoscope small. On the other hand, when the length of the distal end is made long as in the case where the photographing optical system and observing optical system are arranged separately, various other attachments can be added to the space caused by arranging the optical system according to the present invention. Besides, as the same portion of the object can be photographed and observed by an eye, the condition of blur or stain of the window by gastric juice or the like can be found through the observing optical system. Therefore, it is possible to completely prevent failure in photographing which may occur by such causes. The influence of parallax can be also eliminated. Furthermore, as the lens of an endoscope is of the fixed focal length type, it is necessary when photographing to make the stop as small as possible in order to make the depth of focus large. Therefore, even when the light from the object is divided into two portions and utilized for both of photographing and observing purposes, as in the case of the present invention, decrease in intensity of light is extremely small and has no unfavourable influence on observation, because it is desirable that the small hole provided to the reflecting mirror is as small as possible and the stop of the observing optical system is at a position other than the position of said small hole as described already.

Besides, in case of the embodiment shown in FIG. 2, the angle between the reflecting mirror 13, i.e., stop surface and the optical axis of the photographing optical system can be made close to 90°. Consequently, unbalance of the decrease in intensity of marginal ray can be eliminated and it is possible to make the field angle large.

We claim:

1. A single-lens reflex optical system for an endoscope of the type which is inserted into body cavities, said optical system arranged at the distal end of the endoscope and comprising a photographing optical system, a reflecting mirror arranged in inclined position with respect to the optical axis of said photographing optical system and having means defining a small hole arranged substantially at the stop of said photographing optical sytem and functioning as an aperture stop therefor, a film, said photographing optical system focusing photographing light penetrating the hole on the film, said reflecting mirror functioning to reflect observing light, an observing optical system and an image guide arranged along the optical axis of the observing light, wherein the observing light is focused on an end surface of said image guide.

2. A single-lens reflex optical system for an endoscope according to claim 1, further comprising a window serving as a cover-glass, said window arranged on the optical axis of said photographing optical system and functioning to pass through light from the object, the surface of said window that faces said reflecting mirror being concave.

3. A single-lens reflex optical system for an endoscope according to claim 1, further comprising two cemented isosceles right angular prisms having said reflecting mirror on the cemented surface of said prisms, a portion of the light from the object incident on said prisms passing through the hole of said reflecting mirror and being focused on the film, with the rest of the light from the object being reflected by said reflecting mirror and being focused on the end of said image guide by said observing optical system.

4. A single-lens reflex optical system for an endoscope according to claim 1, further comprising a penta-prism having said reflecting mirror on one surface that faces said film and further having a reflecting surface where the light reflected by said reflecting mirror arrives, a portion of the incident light from the object on said penta-prism passing through the hole of said reflecting mirror and being focused on the film, with the rest of the light from the object being reflected by said reflecting mirror and being further reflected by said reflecting surface and being focused on the end of said image guide by said observing optical system.

* * * * *